(12) United States Patent
Patsilaras et al.

(10) Patent No.: US 9,858,196 B2
(45) Date of Patent: *Jan. 2, 2018

(54) POWER AWARE PADDING

(71) Applicant: QUALCOMM Incorporated, San Diego, CA (US)

(72) Inventors: George Patsilaras, Del Mar, CA (US); Ali Iranli, San Diego, CA (US); Andrew Edmund Turner, San Diego, CA (US); Bohuslav Rychlik, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 170 days.

This patent is subject to a terminal disclaimer.

(21) Appl. No.: 14/462,773

(22) Filed: Aug. 19, 2014

(65) Prior Publication Data
US 2016/0055094 A1 Feb. 25, 2016

(51) Int. Cl.
*G06F 12/00* (2006.01)
*G06F 12/0893* (2016.01)
*G06F 12/0886* (2016.01)
*G06F 13/00* (2006.01)
*G06F 13/28* (2006.01)

(52) U.S. Cl.
CPC ...... *G06F 12/0893* (2013.01); *G06F 12/0886* (2013.01); *G06F 2212/1028* (2013.01); *G06F 2212/1044* (2013.01); *G06F 2212/401* (2013.01); *Y02B 60/1225* (2013.01)

(58) Field of Classification Search
CPC ....... G06F 2212/401; G06F 2212/1044; G06F 12/0893; G06F 12/0866; G06F 12/0886
See application file for complete search history.

(56) References Cited

U.S. PATENT DOCUMENTS

| 3,800,294 A | | 3/1974 | Lawlor |
| 5,481,701 A | | 1/1996 | Chambers |
| 5,652,857 A | | 7/1997 | Shimoi et al. |
| 6,061,764 A | * | 5/2000 | Chittor ................ G06F 12/0831 710/107 |

(Continued)

OTHER PUBLICATIONS

International Search Report and Written Opinion—PCT/US2015/042095—ISA/EPO—dated Oct. 29, 2015.

*Primary Examiner* — Mark A Giardino, Jr.
(74) *Attorney, Agent, or Firm* — The Marbury Law Group, PLLC

(57) ABSTRACT

Aspects include computing devices, systems, and methods for implementing a cache memory access requests for data smaller than a cache line and eliminating overfetching from a main memory by combining the data with padding data of a size of a difference between a size of a cache line and the data. A processor may determine whether the data, uncompressed or compressed, is smaller than a cache line using a size of the data or a compression ratio of the data. The processor may generate the padding data using constant data values or a pattern of data values. The processor may send a write cache memory access request for the combined data to a cache memory controller, which may write the combined data to a cache memory. The cache memory controller may send a write memory access request to a memory controller, which may write the combined data to a memory.

30 Claims, 10 Drawing Sheets

(56) References Cited

U.S. PATENT DOCUMENTS

| | | |
|---|---|---|
| 6,240,506 B1 | 5/2001 | Miller |
| 7,225,297 B2 | 5/2007 | Heil et al. |
| 7,257,693 B2 | 8/2007 | Newburn et al. |
| 7,587,005 B2 * | 9/2009 | Tran ................. H03M 13/37 375/341 |
| 8,504,773 B1 * | 8/2013 | Glasco ............... G06F 15/167 711/118 |
| 8,627,041 B2 | 1/2014 | Glasco et al. |
| 2002/0091892 A1 | 7/2002 | Vondran et al. |
| 2003/0131184 A1 | 7/2003 | Kever |
| 2005/0144387 A1 | 6/2005 | Adl-Tabatabai et al. |
| 2009/0147882 A1 * | 6/2009 | Rha ................... H04L 25/4915 375/295 |
| 2010/0088464 A1 | 4/2010 | Yang |
| 2012/0151222 A1 | 6/2012 | Koifman et al. |
| 2014/0006745 A1 | 1/2014 | Fontenot et al. |
| 2015/0178211 A1 | 6/2015 | Hiramoto et al. |
| 2016/0055093 A1 | 2/2016 | Turner et al. |

\* cited by examiner

POWER AWARE PADDING

RELATED APPLICATIONS

This application is related to U.S. patent application Ser. No. 14/462,763 entitled "Supplemental Write Cache Command For Bandwidth Compression", which is filed contemporaneously with this application and is hereby incorporated by reference in its entirety.

BACKGROUND

Lossless compression is used in systems as a way to reduce the amount of data that has to be read from or written back to a main memory. Compression works on segments of input data, typically of fixed size, which are compressed into smaller block sizes. Lossless compressions use segments of configurable sizes. An example would be compressing 256 byte segments into 64 byte blocks, 128 byte blocks, 192 byte blocks, or 256 byte blocks depending on the compression rate that the algorithm can achieve. This compressed data would then be stored in caches until it is written back to the main memory. Due to the nature of compression there can be unused holes in a physical address space of the cache. These holes can occur within a cache line. When the data is propagated through a cache with a larger cache line than the smallest compressed size multiple, overfetch of data from the cache to the main memory results.

When requesting a small sized block of data from the cache, the cache must fill the entire line, but due to the holes in compressed data, only a portion of that line will contain useful data as the holes in the cache line will be filled with irrelevant data. This results in overfetching by the cache to a main memory with part of the overfetch being garbage. For example if a segment is compressed to 64 bytes or 192 bytes and requested from a cache with 128 byte lines, then an extra 64 bytes of useless data will be loaded to the cache in each case to fill the hole in the cache line. In a good compression scheme, a large fraction of the compressed blocks will be the smallest size. Consequently the benefits of bandwidth compression are diminished and needless power is consumed fetching unnecessary data and writing back that random data.

SUMMARY

The methods and apparatuses of various aspects provide circuits and methods for executing cache memory access requests for data on a computing device may include combining data smaller than a cache line and padding data into combined data configured to fill a cache line, and sending a write cache memory access request for the combined data.

An aspect method may further include determining whether the data is smaller than a cache line, and generating the padding data such that the padding data is of a size of a difference between a size of a cache line and the data.

In an aspect, determining whether the data is smaller than a cache line may include using the size of the data to determine whether the data is smaller than a cache line.

An aspect method may further include compressing uncompressed data to generate the data smaller than a cache line, in which determining whether the data is smaller than a cache line includes using a compression ratio of the data to determine whether the data is smaller than a cache line.

In an aspect, the padding data are constant values. In an aspect, the padding data are a pattern of data values.

An aspect method may further include receiving the write cache memory access request for the combined data from a processor, storing the combined data in a cache line to which the combined data is addressed by the write cache memory access request, sending a write memory access request for the combined data; receiving the write memory access request for the combined data from a cache memory controller; and storing the combined data in a memory.

An aspect includes a computing device having a processor, a cache memory controller, a cache memory, a memory controller, and a memory communicatively connected to each other in which the processor and the cache memory controller are configured to perform operations of one or more of the aspect methods described above.

An aspect includes a non-transitory processor-readable medium having stored thereon processor-executable instructions configured to cause a processor and a cache memory controller to perform operations of one or more of the aspect methods described above.

An aspect includes a computing device having means for performing functions of one or more of the aspect methods described above.

BRIEF DESCRIPTION OF THE DRAWINGS

The accompanying drawings, which are incorporated herein and constitute part of this specification, illustrate example aspects of the invention, and together with the general description given above and the detailed description given below, serve to explain the features of the invention.

DETAILED DESCRIPTION

Figure 1:
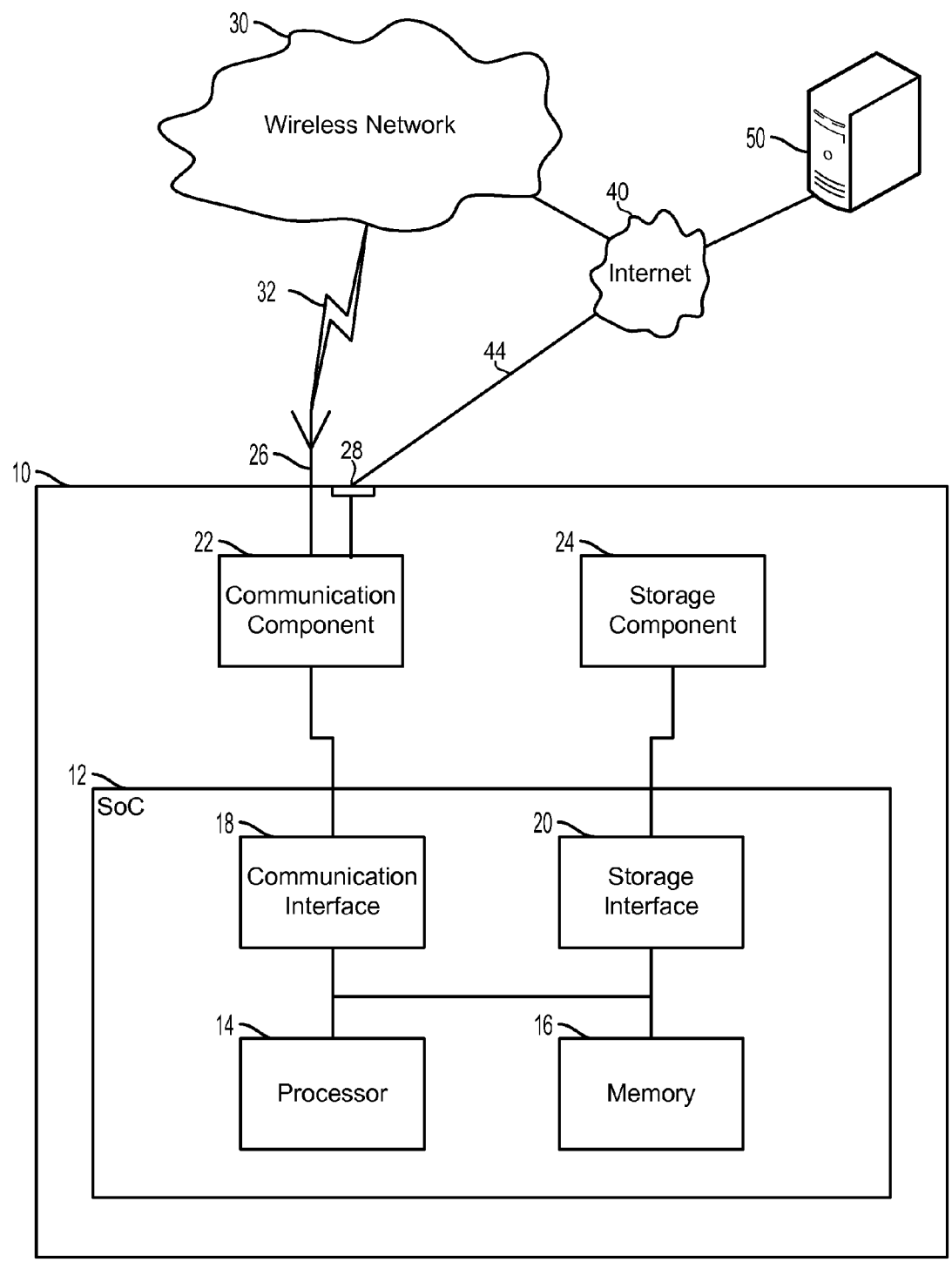
FIG. 1 is a component block diagram illustrating a computing device suitable for implementing an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" and "mobile computing device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices that include a memory, and a multi-core programmable processor. While the various aspects are particularly useful for mobile computing devices, such as smartphones, which have limited memory and battery resources, the aspects are generally useful in any electronic device that implements a plurality of memory devices and a limited power budget in which reducing the power consumption of the processors can extend the battery-operating time of the mobile computing device.

The term "system-on-chip" (SoC) is used herein to refer to a set of interconnected electronic circuits typically, but not exclusively, including a hardware core, a memory, and a communication interface. A hardware core may include a variety of different types of processors, such as a general purpose processor, a central processing unit (CPU), a digital signal processor (DSP), a graphics processing unit (GPU), an accelerated processing unit (APU), an auxiliary processor, a single-core processor, and a multi-core processor. A hardware core may further embody other hardware and hardware combinations, such as a field programmable gate array (FPGA), an application-specific integrated circuit (ASCI), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

Aspects include methods and computing devices implementing such methods for eliminating overfetching to a main memory by a cache by writing data values (e.g., all "0"s) to the portions of the cache line not filled with compressed data. Such aspects include a new supplemental write command that fills in the rest of the cache line.

Data values may be written to the cache by a cache memory controller when requesting the compressed data from the main memory. A cache memory controller receiving the hybrid read cache memory access request with the supplemental write command may perform a read of compressed data smaller than a cache line, and when the compressed data is not in the cache (a cache miss), may retrieve the compressed data from main memory and write supplemental data (e.g., "0" or "1") to fill out the unused portions of the cache line. For example, if a READ request from the processor for 64 bytes of compressed data from the cache with 128 byte cache lines results in a cache miss, the cache memory controller may allocate a cache line containing the address for the requested compressed data and request the compressed data from the main memory. This request to the main memory may be for only the compressed data regardless of the size of the cache line. Thus, the request for the compressed data from the cache memory controller may be for a block of compressed data smaller than the cache line. In response to such a request the cache memory controller may write the compressed data retrieved from the main memory to the allocated cache line. As part of this write process, the cache memory controller may also write supplemental data, such as all 0's (or 1's), to the remaining portions of the cache line. For example, when writing 64 bytes of compressed data to the cache line of 128 bytes, the remaining 64 bytes of the cache line may be filled with supplemental data. Similarly, the cache memory controller may set the remaining portions of the cache line to the supplemental data in response to a WRITE request from the processor to write compressed data to the cache.

Eliminating retrieval of data from the main memory to fill out the unused portions of the cache line by requesting only the compressed data and filling in unused portions of the cache line with supplemental data eliminates overfetching from the main memory. Thus, the bandwidth and power required to retrieve data from the main memory is reduced because less data is passed between the main memory and the cache.

Aspects include methods and computing devices implementing such methods for writing padding data, such as all 0's (or all 1's), to the cache as part of padded compression data received by the cache from the processor. This enables the processor to compress a block of data to a size smaller than a cache line and add padding data to the compressed data to fill out the portions of the cache line that will not be filled with the compressed data. The processor may send a data packet, including the compressed data and the padding data, in a write request to the cache. In an example, when the compressed data is 64 bytes and the cache line is 128 bytes, the processor may add 64 bytes of padding data to the 64 bytes of compressed data so that the compressed data plus the padding make up a 128 byte data packet. The cache memory controller may receive the data packet and write the data packet to a cache line at a location designated in the write request. Writing the data packet to the cache line fills the cache line with the compressed data and the padding data. When the cached compressed data is copied to the main memory, it may similarly be stored with the padding data in the cache line. When the cached compressed data is retrieved from the main memory, it may similarly be retrieved with the padding data to fill the cache line.

Filling out the portions of the cache line not designated to store the compressed data by writing the compressed data combined with the padding data eliminates overfetching from the main memory. The data is the same size as the cache line, thus when retrieving the compressed data from the main memory, it will include the padding data and no irrelevant data needs to be retrieved from the main memory to fill in missing data in the cache line. Also, power required to retrieve padding data, such as a series of all 0's (or all 1's), is less than the power required to retrieve varying values from the main memory.

For ease of description, the various aspects may be described in terms of their use with compressed data; however, the aspects may be used for any data that does not completely fill a cache line.

FIG. 1 illustrates a system including a computing device 10 in communication with a remote computing device 50 suitable for use with the various aspects. The computing device 10 may include an SoC 12 with a processor 14, a memory 16, a communication interface 18, and a storage interface 20. The computing device may further include a communication component 22 such as a wired or wireless modem, a storage component 24, an antenna 26 for establishing a wireless connection 32 to a wireless network 30, and/or the network interface 28 for connecting to a wired connection 44 to the Internet 40. The processor 14 may include any of a variety of hardware cores, as well as a number of processor cores. The SoC 12 may include one or more processors 14. The computing device 10 may include more than one SoCs 12, thereby increasing the number of processors 14 and processor cores. The computing device 10 may also include processor 14 that are not associated with an SoC 12. Individual processors 14 may be multi-core processors as described below with reference to FIG. 2. The processors 14 may each be configured for specific purposes that may be the same as or different from other processors 14 of the computing device 10. One or more of the processors 14 and processor cores of the same or different configurations may be grouped together.

The memory 16 of the SoC 12 may be a volatile or non-volatile memory configured for storing data and processor-executable code for access by the processor 14. In an aspect, the memory 16 may be configured to store data at least temporarily, such as compressed processing data output by one or more of the processors 14. In an aspect, the memory 16 may be configured to store information for cache memory access request for compressed data using a supplemental write command or power aware padding. The memory 16 may include non-volatile read-only memory (ROM) in order to retain the compressed data accessible by a processor 14 and/or a cache memory controller (as show in FIG. 3).

The computing device 10 and/or SoC 12 may include one or more memories 16 configured for various purposes. In an aspect, one or more memories 16 may be configured to be dedicated to storing the compressed data for access by specific processors 14 and/or cache memory controllers. The memory 16 may store the compressed date in a manner that enables the compressed data to be accessed by the processor 14 and/or the cache memory controller for implementing cache memory access requests for compressed data using a supplemental write command or power aware padding.

The communication interface 18, communication component 22, antenna 26, and/or network interface 28, may work in unison to enable the computing device 10 to communicate over a wireless network 30 via a wireless connection 32, and/or a wired network 44 with the remote computing device 50. The wireless network 30 may be implemented using a variety of wireless communication technologies, including, for example, radio frequency spectrum used for wireless communications, to provide the computing device 10 with a connection to the Internet 40 by which it may exchange data with the remote computing device 50.

The storage interface 20 and the storage component 24 may work in unison to allow the computing device 10 to store data on a non-volatile storage medium. The storage component 24 may be configured much like an aspect of the memory 16 in which the storage component 24 may store the compressed data, such that information may be accessed by one or more processors 14 and/or cache memory controllers. The storage component 24, being non-volatile, may retain the information even after the power of the computing device 10 has been shut off. When the power is turned back on and the computing device 10 reboots, the information stored on the storage component 24 may be available to the computing device 10. The storage interface 20 may control access to the storage device 24 and allow the processor 14 to read data from and write data to the storage device 24.

Some or all of the components of the computing device 10 may be differently arranged and/or combined while still serving the necessary functions. Moreover, the computing device 10 may not be limited to one of each of the components, and multiple instances of each component may be included in various configurations of the computing device 10.

Figure 2:
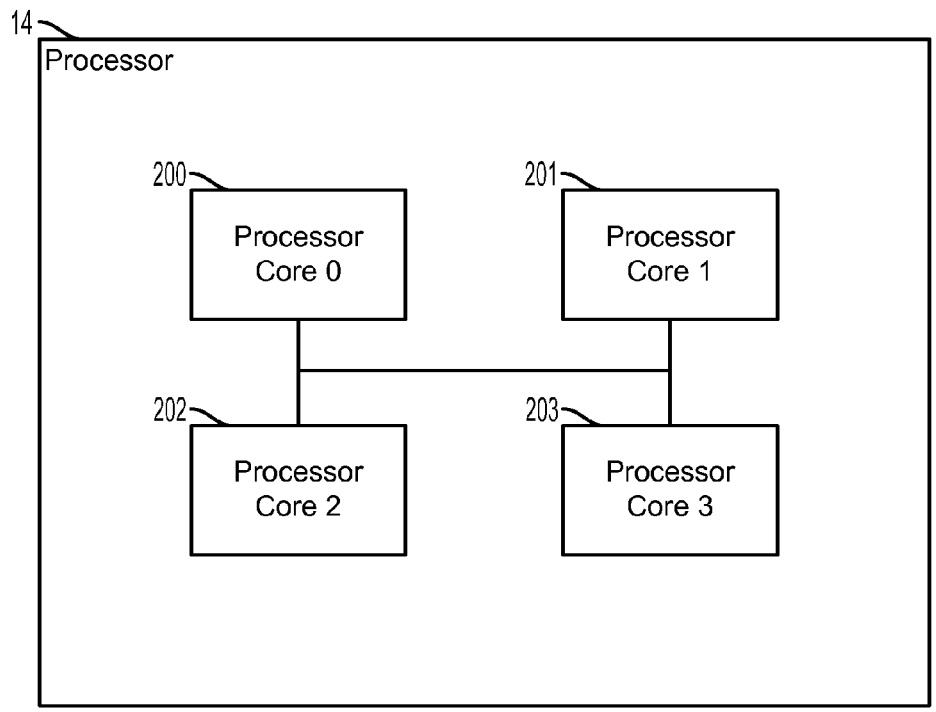
FIG. 2 is a component block diagram illustrating an example multi-core processor suitable for implementing an aspect.

FIG. 2 illustrates a multi-core processor 14 suitable for implementing an aspect. The multi-core processor 14 may have a plurality of homogeneous or heterogeneous processor cores 200, 201, 202, 203. The processor cores 200, 201, 202, 203 may be homogeneous in that, the processor cores 200, 201, 202, 203 of a single processor 14 may be configured for the same purpose and have the same or similar performance characteristics. For example, the processor 14 may be a general purpose processor, and the processor cores 200, 201, 202, 203 may be homogeneous general purpose processor cores. Alternatively, the processor 14 may be a graphics processing unit or a digital signal processor, and the processor cores 200, 201, 202, 203 may be homogeneous graphics processor cores or digital signal processor cores, respectively. For ease of reference, the terms "processor" and "processor core" may be used interchangeably herein.

The processor cores 200, 201, 202, 203 may be heterogeneous in that, the processor cores 200, 201, 202, 203 of a single processor 14 may be configured for different purposes and/or have different performance characteristics. Example of such heterogeneous processor cores may include what are known as "big.LITTLE" architectures in which slower, low-power processor cores may be coupled with more powerful and power-hungry processor cores.

In the example illustrated in FIG. 2, the multi-core processor 14 includes four processor cores 200, 201, 202, 203 (i.e., processor core 0, processor core 1, processor core 2, and processor core 3). For ease of explanation, the examples herein may refer to the four processor cores 200, 201, 202, 203 illustrated in FIG. 2. However, the four processor cores 200, 201, 202, 203 illustrated in FIG. 2 and described herein are merely provided as an example and in no way are meant to limit the various aspects to a four-core processor system. The computing device 10, the SoC 12, or the multi-core processor 14 may individually or in combination include fewer or more than the four processor cores 200, 201, 202, 203 illustrated and described herein.

Figure 3:
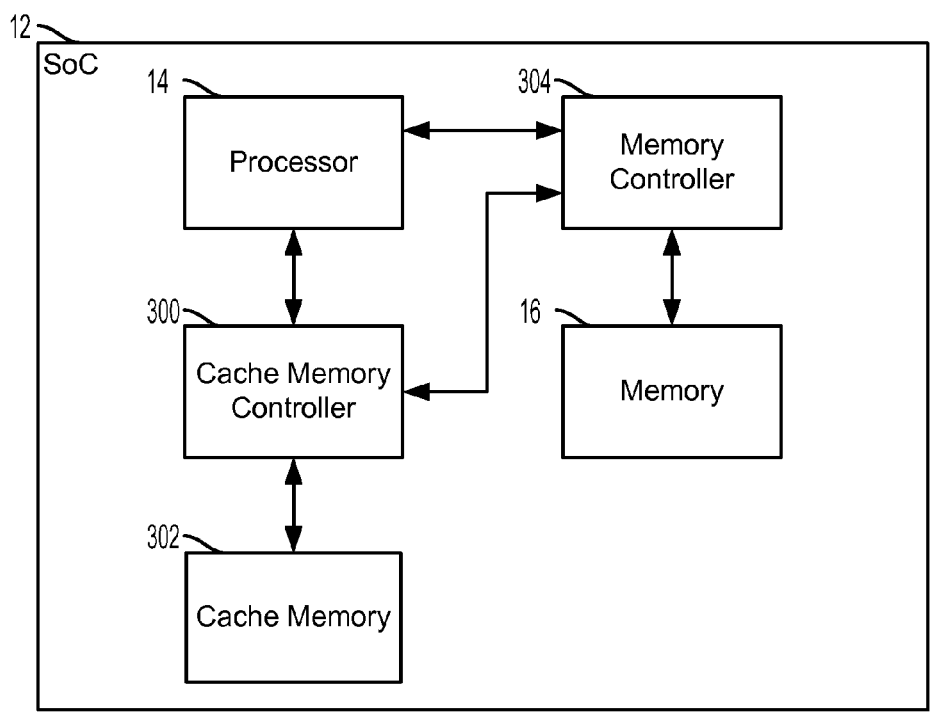
FIG. 3 is a component block diagram illustrating an example system on chip (SoC) including a cache memory controller configured to implement supplemental write cache commands in accordance with an aspect.

FIG. 3 illustrates an example SoC 12 including a cache memory controller 300 and a cache memory 302 configured to store data, including compressed data and data smaller than a cache line, from and allow access to the data by requesting processors 14, including individual processor cores. The SoC 12 may also include a memory controller 304, the memory 16, and other components such as the components of the SoC 12 described above. The cache memory 302 may be configured to temporarily store data and program instructions for quicker access than when accessing the storage component 24 in FIG. 1 or the memory 16. 1. The cache memory 302 may be dedicated for use by a single processor 14 or shared between multiple processors 14. In an aspect, the cache memory 306 may be part of the processor 14, and may be dedicated for use by a single processor core or shared between multiple processor cores of the processor 14.

The cache memory controller 300 may manage access to the cache memory 302 by various processors 14 and subsystems (not shown) of the SoC 12. The cache memory controller 300 may also manage memory access requests for access from the cache memory controller 300 to the memory 16 for retrieving data that may be requested from the cache memory 302 by the processor 14, but not found in the cache memory 302. Part of the access management of the cache memory may include implementing a supplemental write command according to various aspects for write and read cache memory access requests issued by the processor 14 to the cache memory 302 for compressed data. Supplemental write commands may be used for cache memory access requests for compressed data that has a size or a compression ratio such that the compressed data may not fill a cache line.

For a write or read cache memory access request for compressed data, the cache memory controller 304 may receive, as part of or separate from the cache memory access request, a supplemental write command issued by the processor 14. In an aspect, the supplemental write command may be a new signal developed for indicating the supplemental write command, including a new instruction, a persistent field(s) included in the cache memory access request, or part of a communication message associated to the cache memory access request. The signal may contain instructions for instructing the cache memory controller 304 to implement resulting in a supplemental write command. In an aspect, the cache memory controller 304 may be configured to implement a supplemental write command and to recognize a signal configured to trigger the cache memory controller 304 to execute a supplemental write command. The signal may be an existing signal and the cache memory controller 300 may be configured to identify the existing signal to trigger a supplemental write command. In an aspect, the cache memory controller 304 may be configured to identify when the cache memory access request is for compressed data of a particular size, compression ratio and/or location, and determine whether to execute the supplemental write command.

The supplemental write command may be implemented for any write cache memory access request for compressed data when the compressed data may not fill the one or more cache lines that it is addressed to occupy. The supplemental write command may be implemented for any read cache memory access request for compressed data in which the compressed data is not found in a cache line designated by the address of the cache memory access request (e.g. a cache miss). The compressed data may be retrieved from the memory 16 and written to the cache memory 302. The supplemental write command may be implemented for the read cache memory access request when the compressed data written to the cache memory 302 from the memory 16 may not fill the one or more cache lines it is addressed to occupy.

As will be discussed in more detail below, the data received from the processor 14 and the memory 16 for writing to the cache memory 302 may include only the compressed data, regardless of whether the compressed data fills the one or more cache lines it is addressed to occupy. The supplemental write command may be configured to write data values to portions of the cache line(s) written to for storing the compressed data, but not filled by the compressed data. The supplemental write command may cause the cache memory controller 300 to fill the remaining portions of the cache line(s) with supplemental data values that may be constant values or a pattern of values. In an aspect, the supplemental write command may cause the cache memory controller 300 to fill the remaining portions of the cache line(s) with random data values.

Receiving only the compressed data from the memory 16 reduces the bandwidth necessary to transmit the compressed data between the components of the computing device. Traditionally compressed data from the memory 16 may be received as part of a transaction that also includes overfetch data. The overfetch data may include random data values that are added to the compressed data to fill in the portions of the cache line(s) that the compressed data does not fill. For example, for a 128 Byte cache line and compressed data of 64 Bytes, writing the compressed data to the cache line may fill only about half of the cache line. Receiving the compressed data from the memory 16 means that the transaction may also include 64 Bytes of overfetch data to fill in the 128 Byte cache line. Using the supplemental write command, rather than receiving the 64 Byte compressed data and the 64 Byte overfetch data, the cache memory controller 300 may receive only the 64 Byte compressed data from the memory 16. In this example, the data sent between the memory 16 and the cache memory controller 300 is half of what may be transmitted in conventional systems. Rather than receiving the overfetch data from the memory 16, the cache memory controller 300 may fill in the remaining portions of the cache line(s) with supplemental data. Thus, the bandwidth necessary for transmitting data between the memory 16 and the cache memory controller 300 may be reduced. Also, using constant values or a specified pattern to fill the remaining portions of the cache lines may reduce the power used to write to the remaining portions as compared to the writing the random overfetch data. The constant values or pattern may also be used to identify this supplemental data as invalid data without having to set an invalid or dirty indicator. In an aspect, since the cache memory controller 300 is responsible for filling in the cache line(s), it may be aware that the supplemental data is invalid and may avoid setting the invalid or dirty indicator, or may ignore the invalid or dirty bit.

Similarly, for a write cache memory access request using the supplemental write command from the processor 14, the cache memory controller 300 may handle writing constant values, a pattern of values, or random values to fill the remaining portions of the cache lines. As such, similar power saving benefits may occur. As discussed above, the supplemental data may be used to identify invalid data without having to set an invalid or dirty indicator. Also, the cache memory controller 300 may be aware that the supplemental data is invalid and may avoid setting the invalid or dirty indicator, or may ignore the invalid or dirty bit.

In an aspect, for a write cache memory access request the processor 14 may implement power aware padding. As will be discussed in more detail below, the processor 14 may identify that compressed data of the write cache memory access request may not fill the cache line(s) for which the compressed data is addressed. The processor 14 may also identify where in relation to the compressed data may there be unfilled portions of the cache line(s), and the size of the unfilled portions. The processor 14 may add padding data, such as constant data values or a pattern of data values, to the compressed data before sending the write cache memory access request. The processor 14 may send the combined data of the compressed data and padding data together as part of the write cache memory access request. The cache memory controller 300 may receive padded compressed data and treat the padded compressed data as any other data of a write cache memory access request which fills the cache line(s) to which the data is addressed. For example, for a 128

Byte cache line and compressed data of 64 Bytes, writing the compressed data to the cache line may fill only about half of the cache line. The processor 14, having compressed the data, thus being aware of the size and/or compression ratio of the compressed data, and being aware of the amount of data that may be sent to the cache memory 302 over a communication bus and/or the size of the cache lines of the cache memory 302, may determine whether the size of the compressed data may not fill a cache line. With this information, the processor core 14 may determine to add padding data to the compressed data to fill the cache line(s) in the cache memory 302 to which the compressed data is addressed for writing. The padding information, being one or more constant data values or pattern of data values may also result in power savings because of the reduced amount of energy required to transmit and write the padding data to the cache memory 302.

Figure 4:
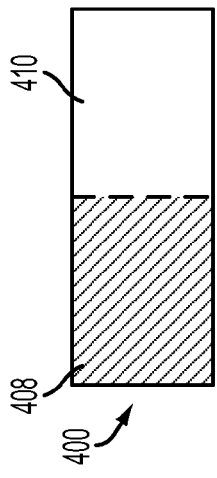
FIG. 4 is an illustration of a portion of a cache memory including a cache line storing compressed data in accordance with an aspect.
Figure 4:
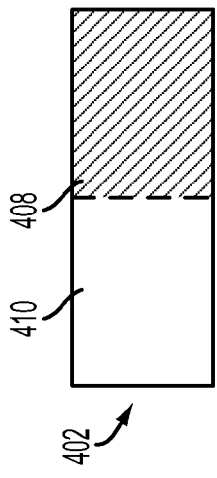
Figure 4:
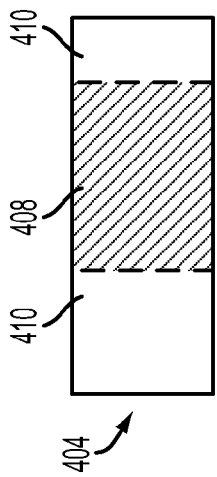
Figure 5:
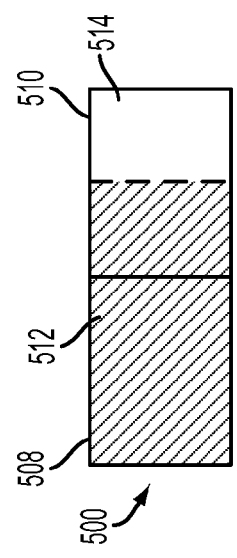
FIG. 5 is an illustration of a portion of a cache memory including a cache line storing compressed data in accordance with an aspect.
Figure 5:
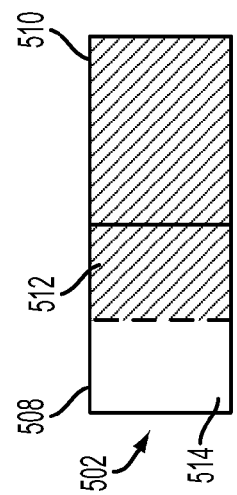
Figure 5:
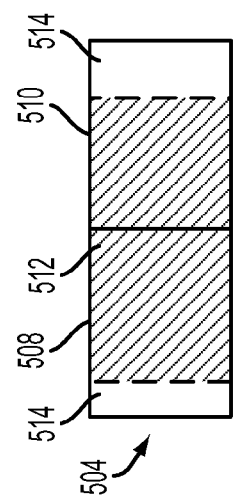

FIGS. 4 and 5 illustrate a portion of a cache memory including a cache line 400, 402, 404, or cache block 500, 502, 504 made up of at least a pair of cache lines 508, 510 storing compressed data 408, 512 in accordance with an aspect. As illustrated in these examples, each cache line 400, 402, 404, 508, 510 may store compressed data that does not completely fill all of the cache lines 400, 402, 404, 508, 510 leaving unfilled portions 410, 514. As described above, unfilled portions 410, 514 may be filled using the supplemental write command or power aware padding. Thus, the unfilled portions 410, 514 may be filled with supplemental data or padding data.

The aspects illustrated in FIG. 4 and FIG. 5 illustrate common situations in which the supplemental write command and power aware padding may be implemented.

Referring to FIG. 4 and continuing with the previous examples, the example cache lines 400, 402, 404, 508, 510 are each 128 Bytes. In the illustrated example the compressed data 408 is 64 Bytes. Since the compressed data 408 is half of the size of the cache lines 400, 402, 404 where it may be stored on the cache memory, 64 Bytes unfilled portions 410 of the cache lines 400, 402, 404 will be created. The 64 Byte unfilled portions 410 of each cache line 400, 402, 404 may be contiguous or in two segments when the compressed data 408 is not aligned with either end of the cache line 404.

Referring to FIG. 5, the pair of cache lines 508, 510 may each be 128 Byte and together form the cache blocks 500, 502, 504 of 256 Bytes. The compressed data 512 in the cache blocks 500, 502, 504 may be larger than a single cache line 508, 510, but smaller than a combination of cache lines 508, 510. For example, the compressed data 512 may be 192 Bytes. Since the compressed data 512 in this example is three quarters of the size of the cache blocks 500, 502, 504 (or the combination of cache lines 508, 510) where it is stored on the cache memory, unfilled portions 514 of the cache lines 508, 510 are created. The unfilled portions 514 for each cache line 508, 510 may equate to 64 Bytes of space, which may be contiguous or in two portions when the compressed data 512 is not aligned with either end of the cache lines 508, 510 in the cache block 504.

In various aspects the cache memory controller may fill the unfilled portions 410, 514 with supplemental data. The cache memory controller may write supplemental data, including constant data values, a pattern of data values, or random values, to the unfilled portions 410, 514. The supplemental data may be written to the unfilled portions 410, 514 before, concurrently with, or after writing the compressed data 408, 512 to the cache lines 400, 402, 404, 508, 510. The cache memory controller may write supplemental data to the unfilled portions 410, 514 in response to receiving the supplemental write command from the processor.

The processor may fill the unfilled portions 410, 514 with padding data. The processor may combine the compressed data 408, 512 with padding data, including constant data values or a pattern of data values. The processor may determine, based on the size of the compressed data and/or the compression ratio, and the size of the cache lines of the cache memory, that the compressed data may not fill the cache lines 400, 402, 404, 508, 510. The padding data may be written to the unfilled portions 410, 514 concurrently with writing the compressed data 408, 512 to the cache lines 400, 402, 404, 508, 510. The cache memory controller may write padding data to the unfilled portions 410, 514 in response to receiving the write cache memory access request for compressed data with padding data from the processor.

In various aspects, the memory cache memory controller and/or the processor may provide full or limited support for the supplemental write command or power aware padding. In an aspect, support may include filling the unfilled portions 410, 514 regardless of where the compressed data 408, 512 is located in the cache lines 400, 402, 404, 508, 510. In various aspects, support may include filling the unfilled portions 410, 514 when the compressed data 408, 512 is aligned with the beginning and/or end of the cache lines 400, 402, 404, 508, 510.

Figure 6:
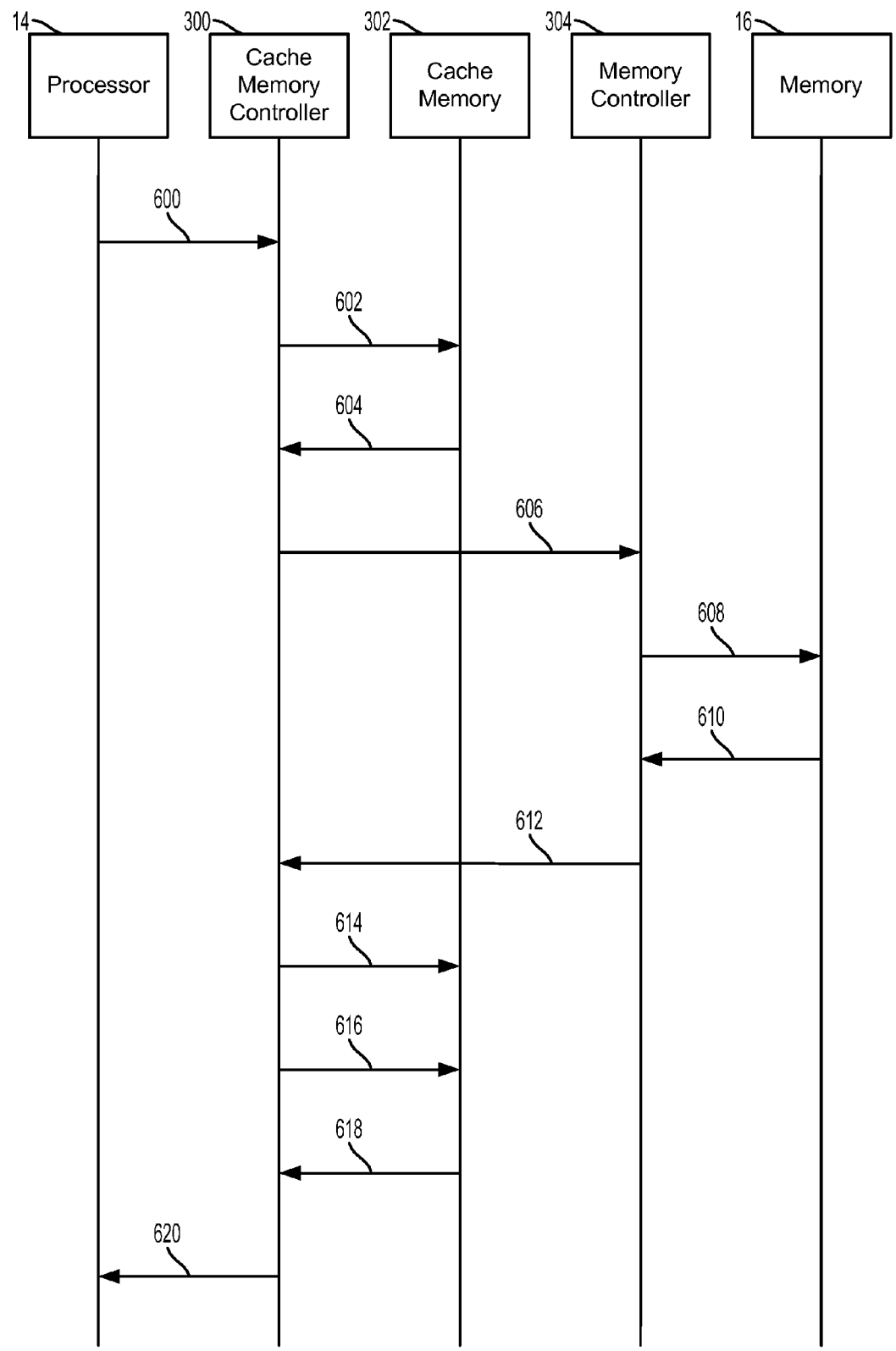
FIG. 6 is process and signals flow diagram of a read cache memory access request with supplemental write command for retrieving compressed data from a cache memory in accordance with an aspect.

FIG. 6 illustrates a process and signal of a read cache memory access request with supplemental write command for retrieving compressed data from the cache memory 302 in accordance with an aspect. The signals 600-620 for executing the read cache memory access request with supplemental write command may be transmitted between the processor 14, the cache memory controller 300, the cache memory 302, the memory controller 304, and the memory 16 via one or more communication busses and various other components of the SoC. The processor 14 may send the read cache memory access request with supplemental write command signal 600 to the cache memory controller 300. Receiving the read cache memory access request with supplemental write command signal 600, the cache memory controller 300 may send a retrieval signal 602 for the data requested by the read cache memory access request with supplemental write command to the cache memory 300. A cache miss signal 604 from the cache memory 302 to the cache memory controller 300 may indicate to the cache memory controller 300 that the requested data is not found in the cache. Although the processor 14 may expect the requested data to be found in the cache memory 302, the data may not be found for various reasons. For example, the requested data may be evicted prior to attempts to retrieve it based on various data eviction schemes that may be specified for the cache memory 302.

The cache memory controller 300 may issue a read memory access request signal 606 to the memory controller 304 in an attempt to retrieve the requested data backed up on the memory 16. Cache memory 302 is a volatile memory for storing relatively small amounts of data and program instructions for relatively fast access, compared to the memory 16 or the storage device discussed above. The cache memory 302 may include data and program instructions that are duplicates of those stored in the memory 16 or the storage device. In an aspect, the data in the cache memory 302 may be altered and stored back to the memory 16 or the storage device according to various schemes to maintain the integrity of the data in the computing device. Thus, the memory access controller 300 may know where in the memory 16 the missing requested data from the cache memory 302 may be backed up. Receiving the memory access request signal 606, the memory controller 304 may send a retrieval signal 608 for the data requested by the read cache memory access request with supplemental write command to the memory 16. The memory 16 may provide the requested data in a return signal 610 to the memory controller 304 excluding any overfetch data. The requested data may be forwarded to the cache memory controller 300 in another return signal 612 by the memory controller 304.

Receiving the return signal 612 with the requested data, the cache memory controller 300 may send a write signal 614 with the requested data to the cache memory 302 to write the requested data to a specified address/cache line(s). The cache memory controller 300 may also send a supplemental write signal 616 with supplemental data to the cache memory 302 to write the supplemental data to a specified address/cache line(s) where the writing of the requested data creates unfilled portions in the cache lines. In an aspect, the order of the write signal 614 with the requested data and the write signal 616 with supplemental data may be reversed. In an aspect, the write signal 614 with the requested data and the write signal 616 with supplemental data may be combined and sent as a single signal, or sent concurrently. The cache memory 302 may send the cache memory controller 300 a return signal 618 with the requested data, and the cache memory controller 300 may forward the requested data to the processor 14 by a return signal 620. In an aspect the return signal 618 with the requested data and the return signal 620 may exclude the supplemental data of the cache lines from which the requested data may be retrieved.

Figure 7:
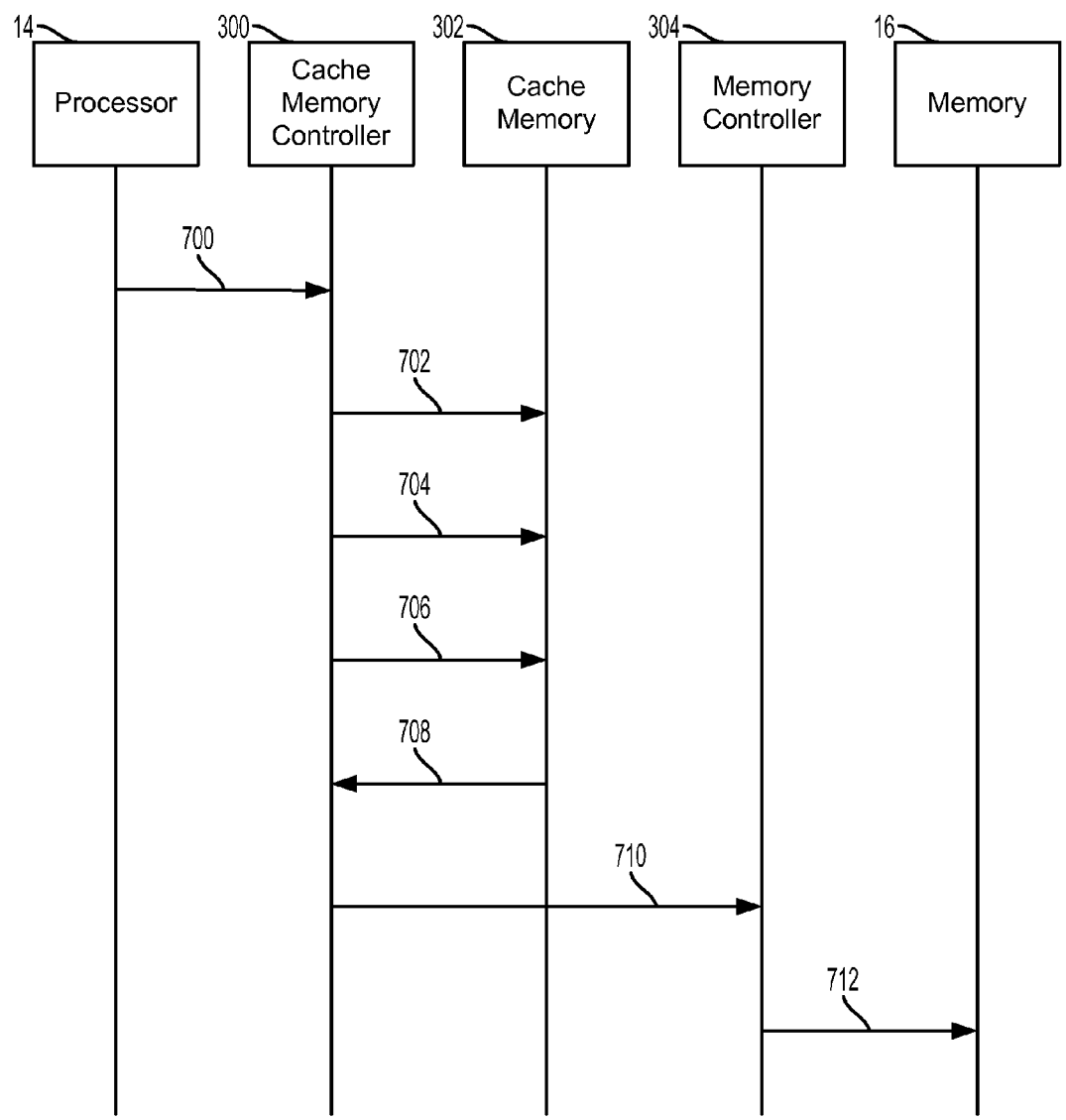
FIG. 7 is process and signals flow diagram of a write cache memory access request with supplemental write command for writing compressed data to a cache memory in accordance with an aspect.

FIG. 7 illustrates a process and signals of a write cache memory access request with supplemental write command for writing compressed data to a cache memory 302 in accordance with an aspect. The signals 700-712 for executing the write cache memory access request with supplemental write command may be transmitted between the processor 14, the cache memory controller 300, the cache memory 302, the memory controller 304, and the memory 16, via one or more communication busses and various other components of the SoC. The processor 14 may send the write cache memory access request with supplemental write command signal 700 to the cache memory controller 300. Receiving the write cache memory access request with supplemental write command signal 600, the cache memory controller 300 may send a send a write signal 702 with the requested data to the cache memory 302 to write the requested data to a specified address/cache line(s). The cache memory controller 300 may also send a supplemental write signal 704 with supplemental data to the cache memory 302 to write the supplemental data to a specified address/cache line(s) where the writing of the requested data creates unfilled portions in the cache lines. In an aspect, the order of the write signal 702 with the requested data and the write signal 704 with supplemental data may be reversed. In an aspect, the write signal 702 with the requested data and the write signal 704 with supplemental data may be combined and sent as a single signal, or sent concurrently.

As described above, the data written to the cache memory 302 may be backed up to the memory 16. In doing so, the cache memory controller 300 may send a retrieval signal 706 for the requested data. In an aspect, the retrieval signal 706 for the requested data may be temporally separated from the write cache memory access request with a supplemental write command signal 700 such that one or more cache memory access requests may have occurred. Thus, the requested data in this instance is named as such to identify the data related to the write cache memory access request with supplemental write command signal 700 even though there may be no pending request from the processor 14 relating to the requested data. The cache memory 302 may send the cache memory controller 300 a return signal 708 with the requested data. The cache memory controller 300 may issue a write memory access request signal 710 to the memory controller 304 to write the requested data the memory 16. In an aspect the return signal 708 with the requested data and the write memory access request signal 710 may exclude the supplemental data of the cache lines from which the requested data may be retrieved. Receiving the write memory access request signal 710 with the requested data, the memory access controller 304 may send a write signal 712 with the requested data to the memory 16.

Figure 8:
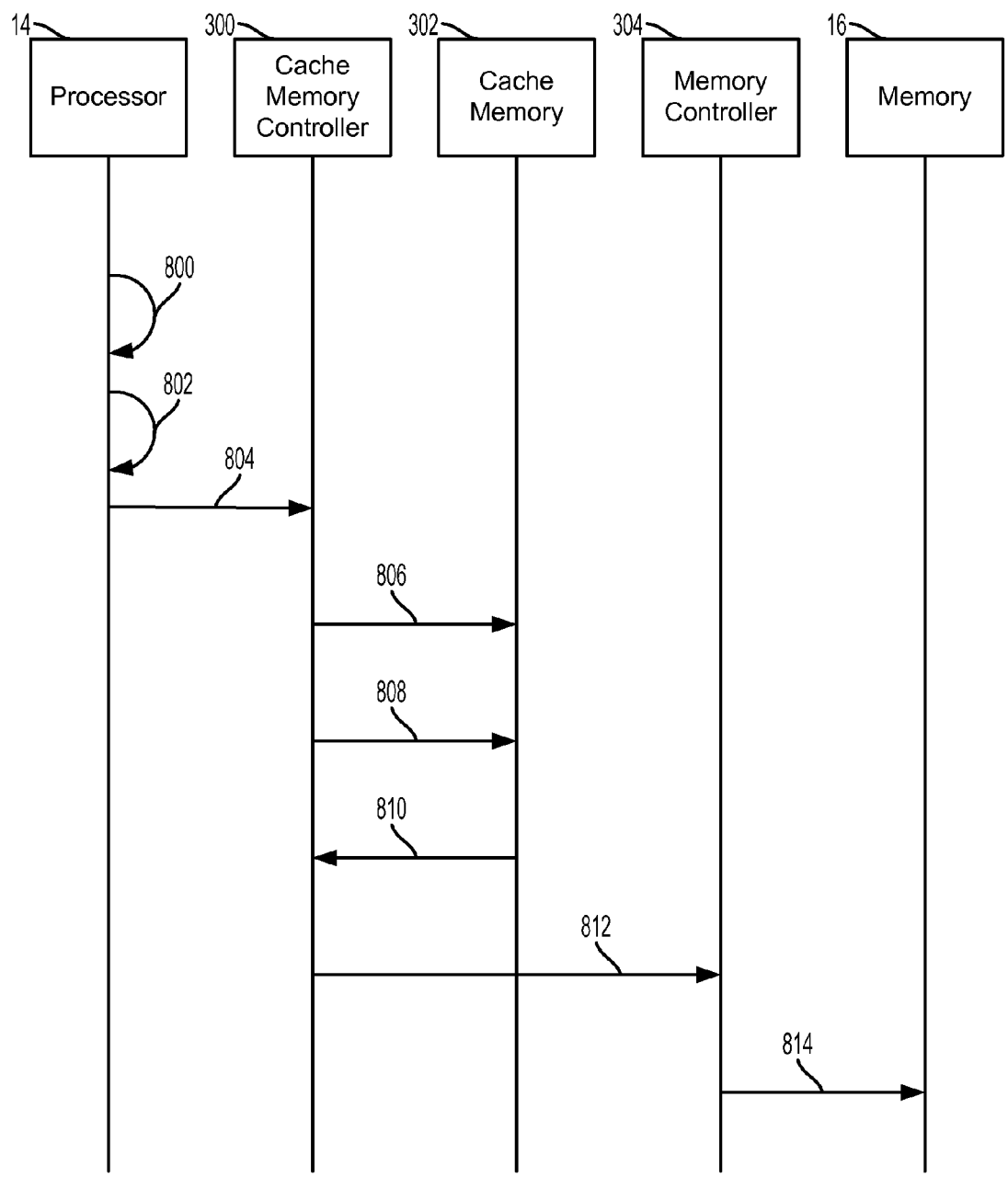
FIG. 8 is process and signals flow diagram of a write cache memory access request with power aware padding for writing compressed data to a cache memory in accordance with an aspect.

FIG. 8 illustrates a process and signals of a write cache memory access request with power aware padding for writing compressed data to a cache memory 302 in accordance with an aspect. The signals 800-814 for executing the write cache memory access request with power aware padding may be transmitted between the processor 14, the cache memory controller 300, the cache memory 302, the memory controller 304, and the memory 16, via one or more communication busses and various other components of the SoC. The processor 14 may compress 800 an amount of data for a write cache memory access request. The processor 14 may determine and combine 802 the padding data to the compressed data to fill the cache line(s) for the write cache memory access request. The processor 14 may further send a write cache memory access request with power aware padding signal 804 to the cache memory controller 300. The write cache memory access request with power aware padding signal 804 may include requested data including the compressed data combined with the padding data. Receiving the write cache memory access request with power aware padding signal 804, the cache memory controller 300 may send a write signal 806 with the requested data to the cache memory 302 to write the requested data to a specified address/cache line(s).

As described above, the data written to the cache memory 302 may be backed up to the memory 16. In doing so, the cache memory controller 300 may send a retrieval signal 808 for the requested data. In an aspect, the retrieval signal 808 for the requested data may be temporally separated from the write cache memory access request with power aware padding signal 804 such that one or more cache memory access requests may have occurred. Thus, the requested data in this instance is named as such to identify the data related to the write cache memory access request with power aware padding signal 804 even though there may be no pending request from the processor 14 relating to the requested data. The cache memory 302 may send the cache memory controller 300 a return signal 810 with the requested data. The cache memory controller 300 may issue a write memory access request signal 812 to the memory controller 304 to write the requested data the memory 16. In an aspect the return signal 810 with the requested data and the write memory access request signal 812 may include the padding data of the cache lines from which the requested data may be retrieved. Receiving the write memory access request signal 812 with the requested data, the memory access controller 304 may send a write signal 814 with the requested data to the memory 16.

Figure 9:
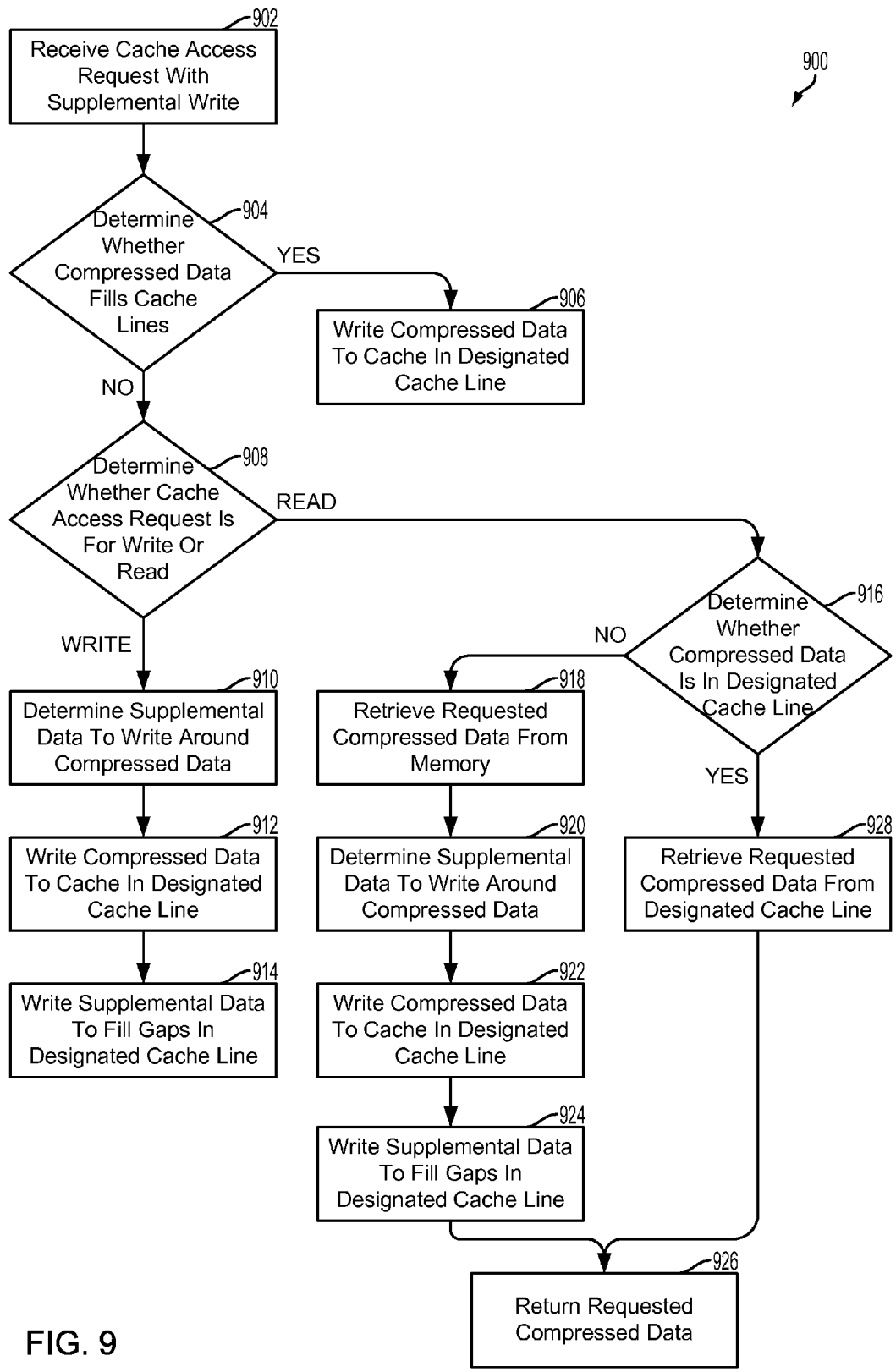
FIG. 9 is a process flow diagram illustrating an aspect method for implementing cache memory access requests with supplemental write command for compressed data.

FIG. 9 illustrates an aspect method 900 for implementing cache memory access requests with supplemental write commands for compressed data. The method 900 may be executed in a computing device using software, general purpose or dedicated hardware, such as the processor or cache memory controller, or a combination of software and hardware. In block 902 the cache memory controller may receive a cache memory access request for reading from or writing to the cache memory, including a supplemental write command. In an aspect, the processor may issue the cache memory access request with the supplemental write command in response to determining that the data requested in the cache memory access request may not fill all of the cache lines to which it is addressed. In an aspect the determination may be based on compressed data of a size or compression ratio such that the compressed data may not fill all of the cache lines to which it is addressed. In an aspect, the determination may be based on uncompressed data that may be too small to fill all of the cache lines to which it is addressed.

In determination block 904, the cache memory controller may determine whether the compressed data fills the cache line(s) to which it is addressed. The cache memory controller may be aware of the size of the cache lines of the cache memory and the addresses of each of the cache lines. Using this information, the cache memory controller may compare the addresses and/or sizes of the cache lines and the compressed data to determine whether the compressed data may fill the cache lines to which it is addressed. In response to determining that the compressed data will fill the cache lines to which it is addressed (i.e. determination block 904="YES"), the cache memory controller may write the compressed data to the cache memory as known in block 906.

In response to determining that the compressed data will not fill the cache lines to which it is addressed (i.e. determination block 904="NO"), the cache memory controller may determine whether the cache memory access request is for reading from or writing to the cache memory in determination block 908. The cache memory access request may contain an indication for instructing the cache memory controller to implement either reading from or writing to the cache memory.

In response to determining that the cache memory access request is a cache write request for writing to the cache memory (i.e. determination block 908="WRITE"), the cache memory controller may determine the supplemental data to write to the unfilled portions of the cache line(s) in block 910. As described above, the supplemental data may include constant data values (e.g., all "0"), a pattern of data values, or random data values. In an aspect, the supplemental data may be predetermined either in software or hardware of the cache memory controller. In block 912, the cache memory controller may write the compressed data to the cache memory at the cache lines to which it is addressed. In block 914, the cache memory controller may write the supplemental data to the cache memory to fill the unfilled portions of the cache lines to which the compressed data is addressed. In an aspect, the order of the write operations in blocks 912 and 914 may be reversed. In an aspect, the write operations in blocks 912 and 914 may be executed concurrently.

In response to determining the cache memory access request is a cache read request for reading from the cache memory (i.e. determination block 908="READ"), the cache memory controller may determine whether the compressed data is located in the cache lines to which it is addressed in determination block 916. As discussed above, regardless of whether the processor expects to locate the compressed data at a certain address in the cache memory, the compressed data may not be found at the certain address for various reasons, such as cache replacement schemes. In response to determining that the compressed data is not located in the cache lines to which it is addressed, which is referred to as a cache miss (i.e. determination block 916="NO"), the cache memory controller may retrieve the compressed data from the memory in block 918. As described above, the cache memory controller may issue a memory access request to the memory access controller to retrieve the compressed data from the memory. Rather than retrieving the compressed data with the overfetch data as is traditionally done, the cache memory controller may request and receive only the compressed data from the memory. Transmitting only the compressed data between the memory and the cache memory controller, rather than the compressed data plus the overfetch data, reduces the bandwidth requirements for memory access requests resulting from cache misses.

In block 920, the cache memory access controller may determine the supplemental data to write to the unfilled portions of the cache line(s) as in block 910 described above. In block 922 the cache memory controller may write the compressed data to the cache memory at the cache lines to which it is addressed as in block 912 described above. In block 924, the cache memory controller may write the compressed data to the cache memory to fill the unfilled portions of the cache lines to which the compressed data is addressed as in block 914 described above. In an aspect, the order of the write operations in blocks 922 and 924 may be reversed. In an aspect, the write operations in blocks 922 and 924 may be executed concurrently.

In block 926, the cache memory controller may return the compressed data to the processor in response to the read cache memory access request. In response to determining that the compressed data is located in the cache lines to which it is addressed, which is known as a cache hit (i.e. determination block 916="YES"), the cache memory controller may retrieve the compressed data from the cache memory in block 928. In block 926, the cache memory controller may return the compressed data to the processor in response to the read cache memory access request.

Figure 10:
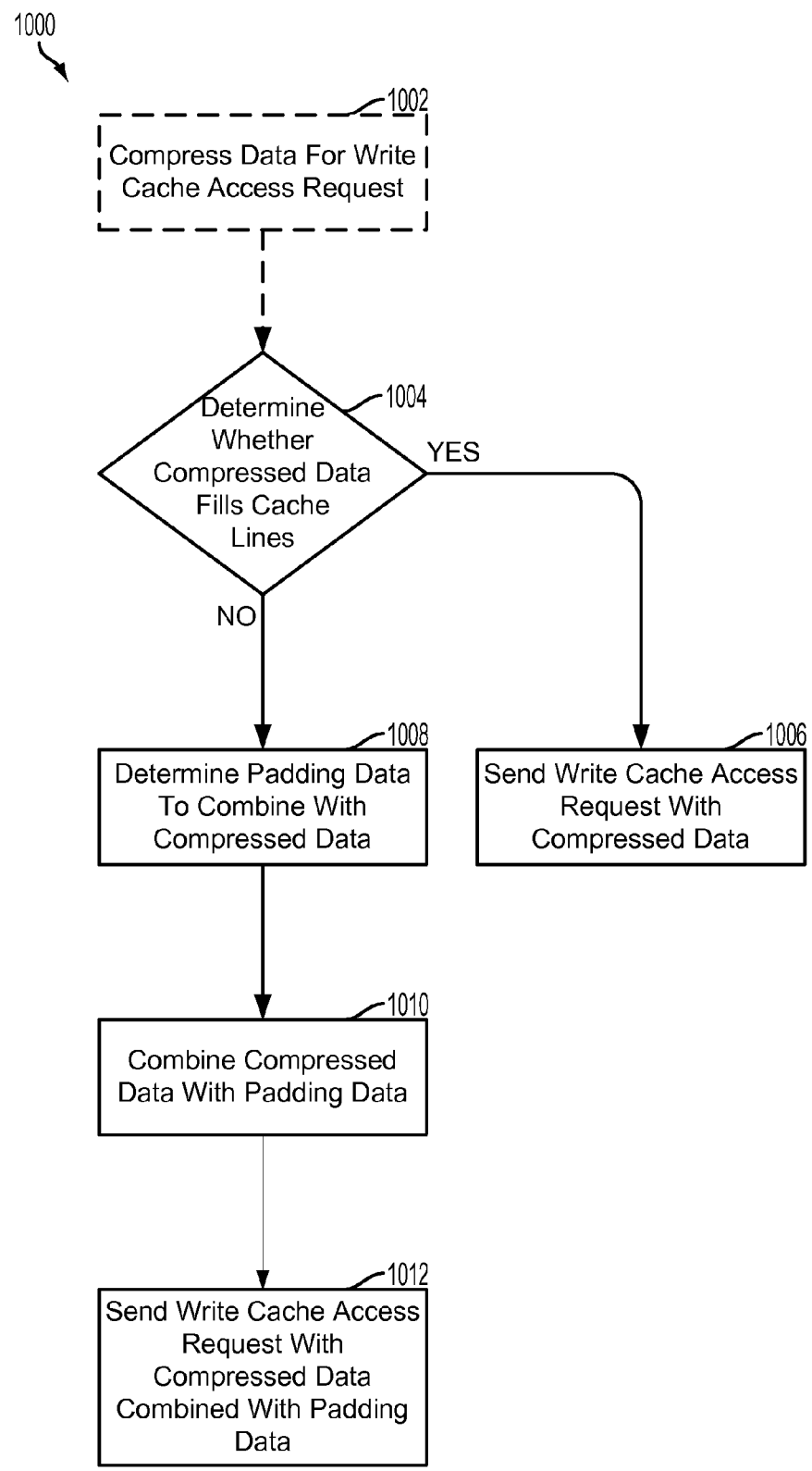
FIG. 10 is a process flow diagram illustrating an aspect method for implementing cache memory access requests with power aware padding for compressed data.

FIG. 10 illustrates an aspect method 1000 for implementing cache memory access requests with power aware padding for compressed data. The method 1000 may be executed in a computing device using software, general purpose or dedicated hardware, such as the processor or cache memory controller, or a combination of software and hardware. As noted above, the aspects herein are related in terms of compressed data for simplicity of explanation; however, the aspect may also apply to data too small to fill one or more cache lines. In optional block 1002 the processor may compress data for a write cache memory access request. In determination block 1004, the processor may determine whether the compressed data will fill the cache line(s) of the cache memory to which the processor may address the compressed data for storage. In an aspect the determination may be based on compressed data of a size or compression ratio such that the compressed data may not fill all of the cache lines to which it is addressed. In an aspect, the determination may be based on uncompressed data that may be too small to fill all of the cache lines to which it is addressed. In response to determining that the compressed data will fill the cache line(s) of the cache memory to which the processor addresses the compressed data for storage (i.e. determination block 1004="YES"), the processor may send a write cache memory access request for the compressed data as known.

In response to determining that the compressed data will not fill the cache line(s) of the cache memory to which the processor addresses the compressed data for storage (i.e. determination block 1004="NO"), the processor may determine padding data (e.g., constants, patterns of data, or random data) to combine with the compressed data such that the combined data may fill the cache line(s) in block 1006. The padding data may generally be determined in terms of reducing the power required to transmit and write the padding data to the cache memory and the memory compared to using random data. The padding data may also be selected as certain values or patterns may be ascribed meaning to the processor, cache memory controller, and/or memory controller, such as identifying the padding data as invalid data. In an aspect, the padding data may be predetermined in software or hardware of the processor.

In block 1010, the processor may combine the compressed data and the padding data. The combination may be executed in such a way that the addressing in the cache memory for the compressed data may not be changed and the padding data may be used to fill the cache line addresses around the compressed data. In an aspect, the combination may alter the addressing of the compressed data to align the compressed data with either the beginning or the end of the cache line(s), and the padding data may be used to fill the cache line addresses after or before the compressed data in the cache line(s). In block 1012, the processor may send a write cache memory access request with the combined data, including the compressed data and the padding data, to the cache memory controller for storing the combined data in the cache memory.

Figure 11:
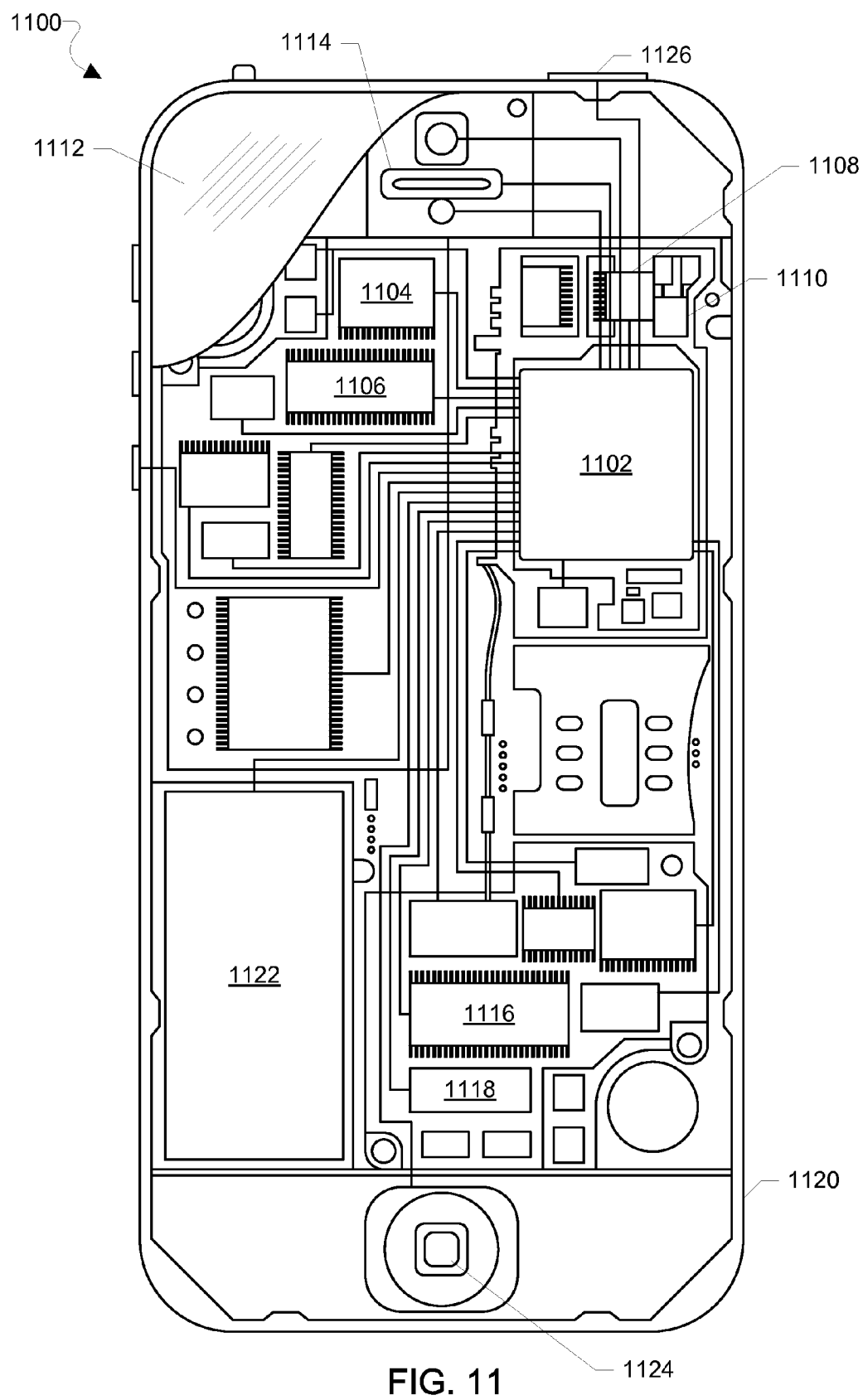
FIG. 11 is component block diagram illustrating an example mobile computing device suitable for use with the various aspects.

FIG. 11 illustrates an example mobile computing device suitable for use with the various aspects. The mobile computing device 1100 may include a processor 1102 coupled to a touchscreen controller 1104 and an internal memory 1106. The processor 1102 may be one or more multicore integrated circuits designated for general or specific processing tasks. The internal memory 1106 may be volatile or non-volatile memory, and may also be secure and/or encrypted memory, or unsecure and/or unencrypted memory, or any combination thereof. Examples of memory types which can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1104 and the processor 1102 may also be coupled to a touchscreen panel 1112, such as a resistive-sensing touchscreen, capacitive-sensing touchscreen, infrared sensing touchscreen, etc. Additionally, the display of the computing device 1100 need not have touch screen capability.

The mobile computing device 1100 may have one or more radio signal transceivers 1108 (e.g., Peanut, Bluetooth, Zigbee, Wi-Fi, RF radio) and antennae 1110, for sending and receiving communications, coupled to each other and/or to the processor 1102. The transceivers 1108 and antennae 1110 may be used with the above-mentioned circuitry to implement the various wireless transmission protocol stacks and interfaces. The mobile computing device 1100 may include a cellular network wireless modem chip 1116 that enables communication via a cellular network and is coupled to the processor.

The mobile computing device 1100 may include a peripheral device connection interface 1118 coupled to the processor 1102. The peripheral device connection interface 1118 may be singularly configured to accept one type of connection, or may be configured to accept various types of physical and communication connections, common or proprietary, such as USB, FireWire, Thunderbolt, or PCIe. The peripheral device connection interface 1118 may also be coupled to a similarly configured peripheral device connection port (not shown).

The mobile computing device 1100 may also include speakers 1114 for providing audio outputs. The mobile computing device 1100 may also include a housing 1120, constructed of a plastic, metal, or a combination of materials, for containing all or some of the components discussed herein. The mobile computing device 1100 may include a power source 1122 coupled to the processor 1102, such as a disposable or rechargeable battery. The rechargeable battery may also be coupled to the peripheral device connection port to receive a charging current from a source external to the mobile computing device 1100. The mobile computing device 1100 may also include a physical button 1124 for receiving user inputs. The mobile computing device 1100 may also include a power button 1126 for turning the mobile computing device 1100 on and off.

Figure 12:
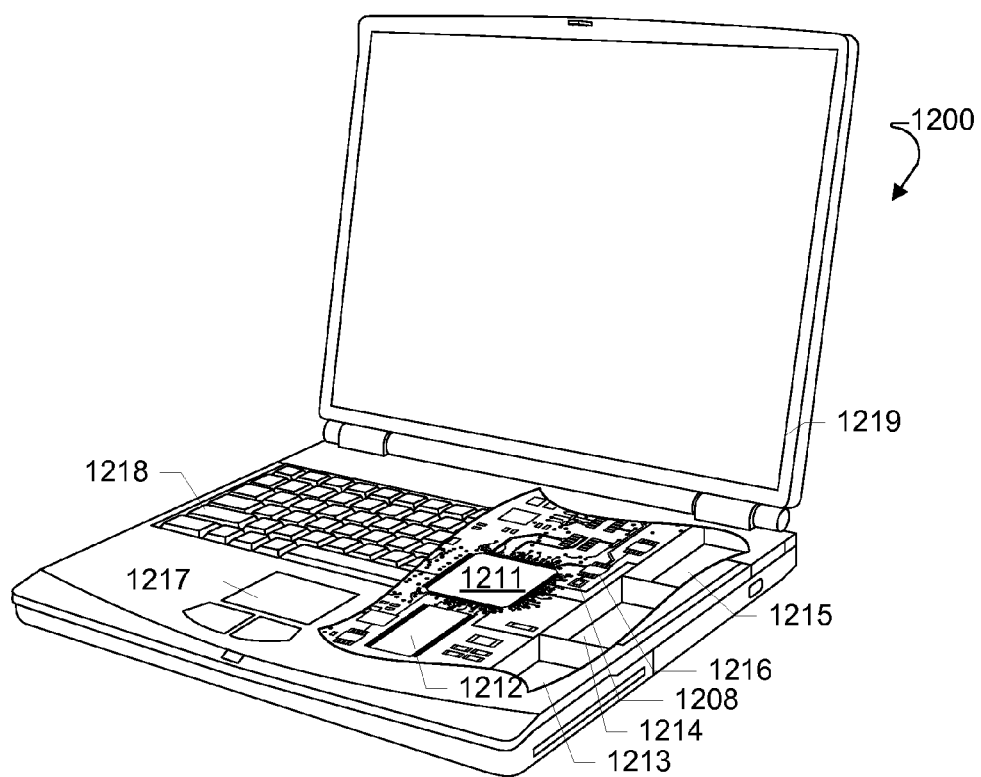
FIG. 12 is component block diagram illustrating an example mobile computing device suitable for use with the various aspects.

The various aspects described above may also be implemented within a variety of mobile computing devices, such as a laptop computer 1200 illustrated in FIG. 12. Many laptop computers include a touchpad touch surface 1217 that serves as the computer's pointing device, and thus may receive drag, scroll, and flick gestures similar to those implemented on computing devices equipped with a touch screen display and described above. A laptop computer 1200 will typically include a processor 1211 coupled to volatile memory 1212 and a large capacity nonvolatile memory, such as a disk drive 1213 of Flash memory. Additionally, the computer 1200 may have one or more antenna 1208 for sending and receiving electromagnetic radiation that may be connected to a wireless data link and/or cellular telephone transceiver 1216 coupled to the processor 1211. The computer 1200 may also include a floppy disc drive 1214 and a compact disc (CD) drive 1215 coupled to the processor 1211. In a notebook configuration, the computer housing includes the touchpad 1217, the keyboard 1218, and the display 1219 all coupled to the processor 1211. Other configurations of the computing device may include a computer mouse or trackball coupled to the processor (e.g., via a USB input) as are well known, which may also be used in conjunction with the various aspects.

Figure 13:
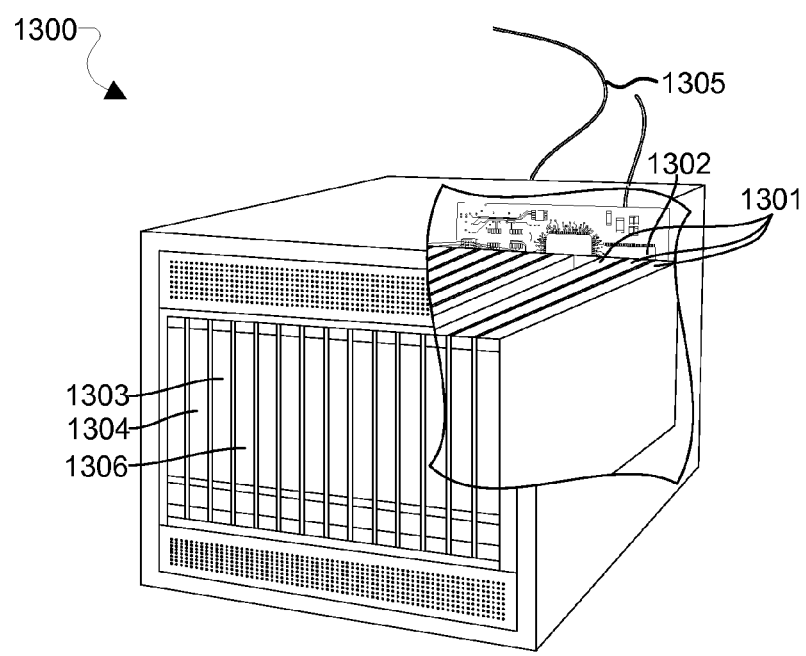
FIG. 13 is component block diagram illustrating an example server suitable for use with the various aspects.

The various aspects may also be implemented in any of a variety of commercially available servers for compressing data in server cache memory. An example server 1300 is illustrated in FIG. 13. Such a server 1300 typically includes one or more multi-core processor assemblies 1301 coupled to volatile memory 1302 and a large capacity nonvolatile memory, such as a disk drive 1304. As illustrated in FIG. 13, multi-core processor assemblies 1301 may be added to the server 1300 by inserting them into the racks of the assembly. The server 1300 may also include a floppy disc drive, compact disc (CD) or DVD disc drive 1306 coupled to the processor 1301. The server 1300 may also include network access ports 1303 coupled to the multi-core processor assemblies 1301 for establishing network interface connections with a network 1305, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many computing devices operating system kernels are organized into a user space (where non-privileged code runs) and a kernel space (where privileged code runs). This separation is of particular importance in Android and other general public license (GPL) environments in which code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for executing cache memory access requests for data on a computing device, comprising:
   altering, by a processor, an address for writing data smaller than a cache line to align the data with an end of a cache line;
   determining, by the processor, padding data to combine with the data smaller than a cache line based on power required for writing the padding data to a cache memory;
   combining, by the processor, the data smaller than a cache line and the padding data into combined data configured to fill a cache line; and
   sending, by the processor to a cache memory controller, a write cache memory access request for the combined data.

2. The method of claim 1, further comprising:
   determining whether the data is smaller than a cache line; and
   generating the padding data such that the padding data is of a size of a difference between a size of a cache line and a size of the data.

3. The method of claim 2, wherein determining whether the data is smaller than a cache line comprises using the size of the data to determine whether the data is smaller than a cache line.

4. The method of claim 2, further comprising compressing uncompressed data to generate the data smaller than a cache line, wherein determining whether the data is smaller than a cache line comprises using a compression ratio of the data to determine whether the data is smaller than a cache line.

5. The method of claim 1, wherein the padding data are constant values.

6. The method of claim 1, wherein the padding data are a pattern of data values.

7. The method of claim 1, wherein determining the padding data to combine with the data smaller than a cache line further comprises determining the padding data to combine with the data smaller than a cache line based on power required for writing the padding data to the cache memory and to a memory, and
the method further comprising:
receiving the write cache memory access request for the combined data from the processor;
storing the combined data in a cache line to which the combined data is addressed by the write cache memory access request; and
sending a write memory access request for the combined data.

8. The method of claim 7, further comprising:
receiving the write memory access request for the combined data from the cache memory controller; and
storing the combined data in the memory.

9. A computing device, comprising:
a processor;
a cache memory controller communicatively connected to the processor;
a cache memory communicatively connected to the cache memory controller;
a memory controller communicatively connected to the cache memory controller; and
a memory communicatively connected to the memory controller,
wherein the processor is configured with processor-executable instructions to perform operations comprising:
altering an address for writing data smaller than a cache line to align the data with an end of a cache line;
determining padding data to combine with the data smaller than a cache line based on power required for writing the padding data to the cache memory;
combining the data smaller than a cache line and the padding data into combined data configured to fill a cache line; and
sending, to the cache memory controller, a write cache memory access request for the combined data.

10. The computing device of claim 9, wherein the processor is configured with processor-executable instructions to perform operations further comprising:
determining whether the data is smaller than a cache line; and
generating the padding data such that the padding data is of a size of a difference between a size of a cache line and a size of the data.

11. The computing device of claim 10, wherein the processor is configured with processor-executable instructions to perform operations such that determining whether the data is smaller than a cache line comprises using the size of the data to determine whether the data is smaller than a cache line.

12. The computing device of claim 10, wherein the processor is configured with processor-executable instructions to perform operations further comprising compressing uncompressed data to generate the data smaller than a cache line, wherein determining whether the data is smaller than a cache line comprises using a compression ratio of the data to determine whether the data is smaller than a cache line.

13. The computing device of claim 9, wherein the processor is configured with processor-executable instructions to perform operations such that the padding data are constant values.

14. The computing device of claim 9, wherein the processor is configured with processor-executable instructions to perform operations such that the padding data are a pattern of data values.

15. The computing device of claim 9, wherein the cache memory controller is configured to perform operations such that determining the padding data to combine with the data smaller than a cache line comprises determining the padding data to combine with the data smaller than a cache line based on power required for writing the padding data to the cache memory and to the memory, and
wherein the cache memory controller is configured to perform operations comprising:
receiving the write cache memory access request for the combined data from the processor;
storing the combined data in a cache line to which the combined data is addressed by the write cache memory access request; and
sending a write memory access request for the combined data.

16. The computing device of claim 15, wherein the memory controller is configured to perform operations comprising:
receiving the write memory access request for the combined data from the cache memory controller; and
storing the combined data in the memory.

17. A non-transitory processor-readable medium having stored thereon processor-executable instructions configured to cause a processor, a cache memory controller, and a memory controller to perform operations comprising:
altering, by the processor, an address for writing data smaller than a cache line to align the data with an end of a cache line;
determining, by the processor, padding data to combine with the data smaller than a cache line based on power required for writing the padding data to a cache memory;
combining, by the processor, the data smaller than a cache line and the padding data into combined data configured to fill a cache line; and
sending, by the processor to the cache memory controller, a write cache memory access request for the combined data.

18. The non-transitory processor-readable medium of claim 17, wherein the stored processor-executable instructions are configured to cause the processor, the cache memory controller, and the memory controller to perform operations further comprising:
determining whether the data is smaller than a cache line; and
generating the padding data such that the padding data is of a size of a difference between a size of a cache line and a size of the data.

19. The non-transitory processor-readable medium of claim 18, wherein the stored processor-executable instructions are configured to cause the processor, the cache memory controller, and the memory controller to perform operations such that determining whether the data is smaller than a cache line comprises using the size of the data to determine whether the data is smaller than a cache line.

20. The non-transitory processor-readable medium of claim 18, wherein the stored processor-executable instructions are configured to cause the processor, the cache memory controller, and the memory controller to perform operations further comprising compressing uncompressed data to generate the data smaller than a cache line, wherein determining whether the data is smaller than a cache line comprises using a compression ratio of the data to determine whether the data is smaller than a cache line.

21. The non-transitory processor-readable medium of claim 17, wherein the stored processor-executable instructions are configured to cause the processor, the cache memory controller, and the memory controller to perform operations such that the padding data are constant values.

22. The non-transitory processor-readable medium of claim 17, wherein the stored processor-executable instructions are configured to cause the processor, the cache memory controller, and the memory controller to perform operations such that the padding data are a pattern of data values.

23. The non-transitory processor-readable medium of claim 17, wherein the stored processor-executable instructions are configured to cause the processor, the cache memory controller, and the memory controller to perform operations such that determining the padding data to combine with the data smaller than a cache line comprises determining the padding data to combine with the data smaller than a cache line based on power required for writing the padding data to the cache memory and to a memory, and
wherein the stored processor-executable instructions are configured to cause the processor, the cache memory controller, and the memory controller to perform operations further comprising:
receiving the write cache memory access request for the combined data from the processor;
storing the combined data in a cache line to which the combined data is addressed by the write cache memory access request;
sending a write memory access request for the combined data;
receiving the write memory access request for the combined data from the cache memory controller; and
storing the combined data in the memory.

24. A computing device, comprising:
means for altering, by a processor, an address for writing data smaller than a cache line to align the data with an end of a cache line;
means for determining, by the processor, padding data to combine with the data smaller than a cache line based on power required for writing the padding data to a cache memory;
means for combining, by the processor, the data smaller than a cache line and the padding data into combined data configured to fill a cache line; and
means for sending, by the processor to a cache memory controller, a write cache memory access request for the combined data.

25. The computing device of claim 24, further comprising:
means for determining whether the data is smaller than a cache line; and
means for generating the padding data such that the padding data is of a size of a difference between a size of a cache line and a size of the data.

26. The computing device of claim 25, wherein the means for determining whether the data is smaller than a cache line comprises means for using the size of the data to determine whether the data is smaller than a cache line.

27. The computing device of claim 25, further comprising means for compressing uncompressed data to generate the data smaller than a cache line, wherein the means for determining whether the data is smaller than a cache line comprises means for using a compression ratio of the data to determine whether the data is smaller than a cache line.

28. The computing device of claim 24, wherein the padding data are constant values.

29. The computing device of claim 24, wherein the padding data are a pattern of data values.

30. The computing device of claim 24, wherein the means for determining the padding data to combine with the data smaller than a cache line comprises means for determining the padding data to combine with the data smaller than a cache line based on power required for writing the padding data to the cache memory and to a memory, and
the computing device further comprising:
means for receiving the write cache memory access request for the combined data from the processor;
means for storing the combined data in a cache line to which the combined data is addressed by the write cache memory access request;
means for sending a write memory access request for the combined data;
means for receiving the write memory access request for the combined data from the cache memory controller; and
means for storing the combined data in the memory.

* * * * *